G. E. MEDLEY.
SPEED CHANGE GEAR.
APPLICATION FILED JUNE 2, 1919.
1,342,920.
Patented June 8, 1920.
3 SHEETS—SHEET 2.
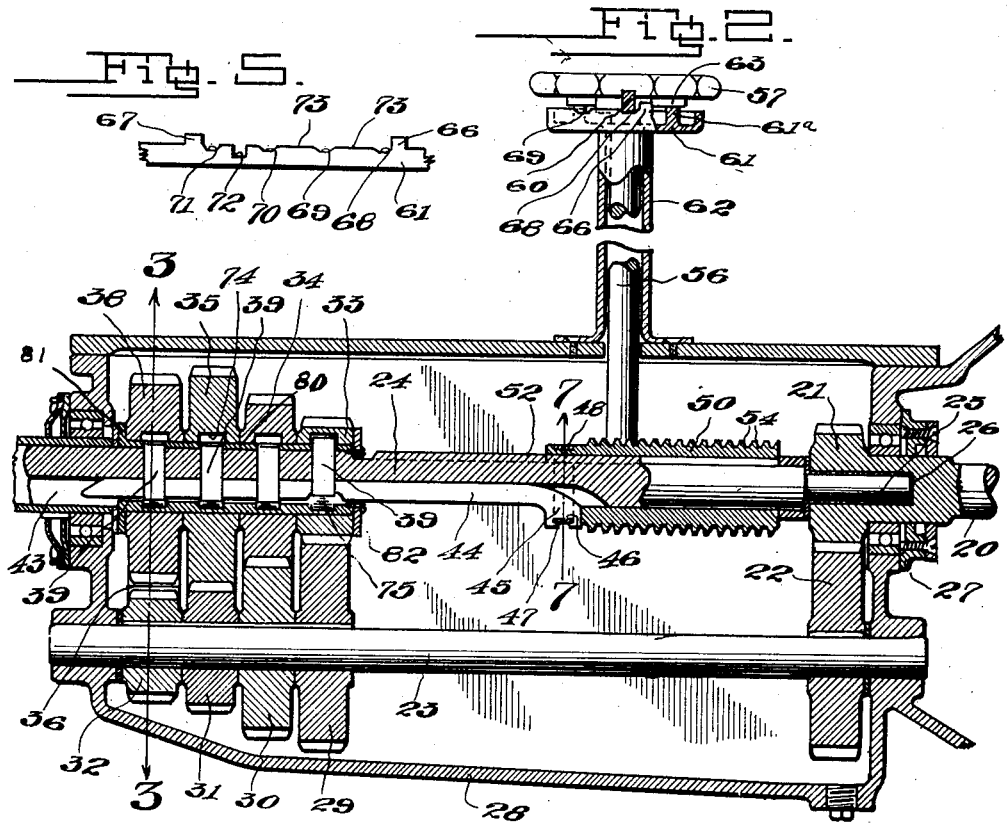
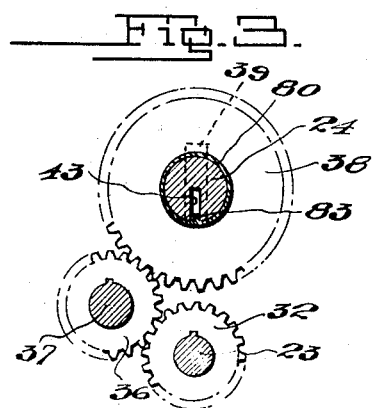
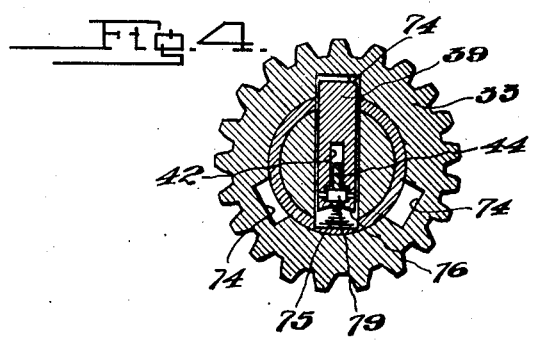
G. E. Medley,
Inventor
By Lancaster & Allwine
his Attorneys

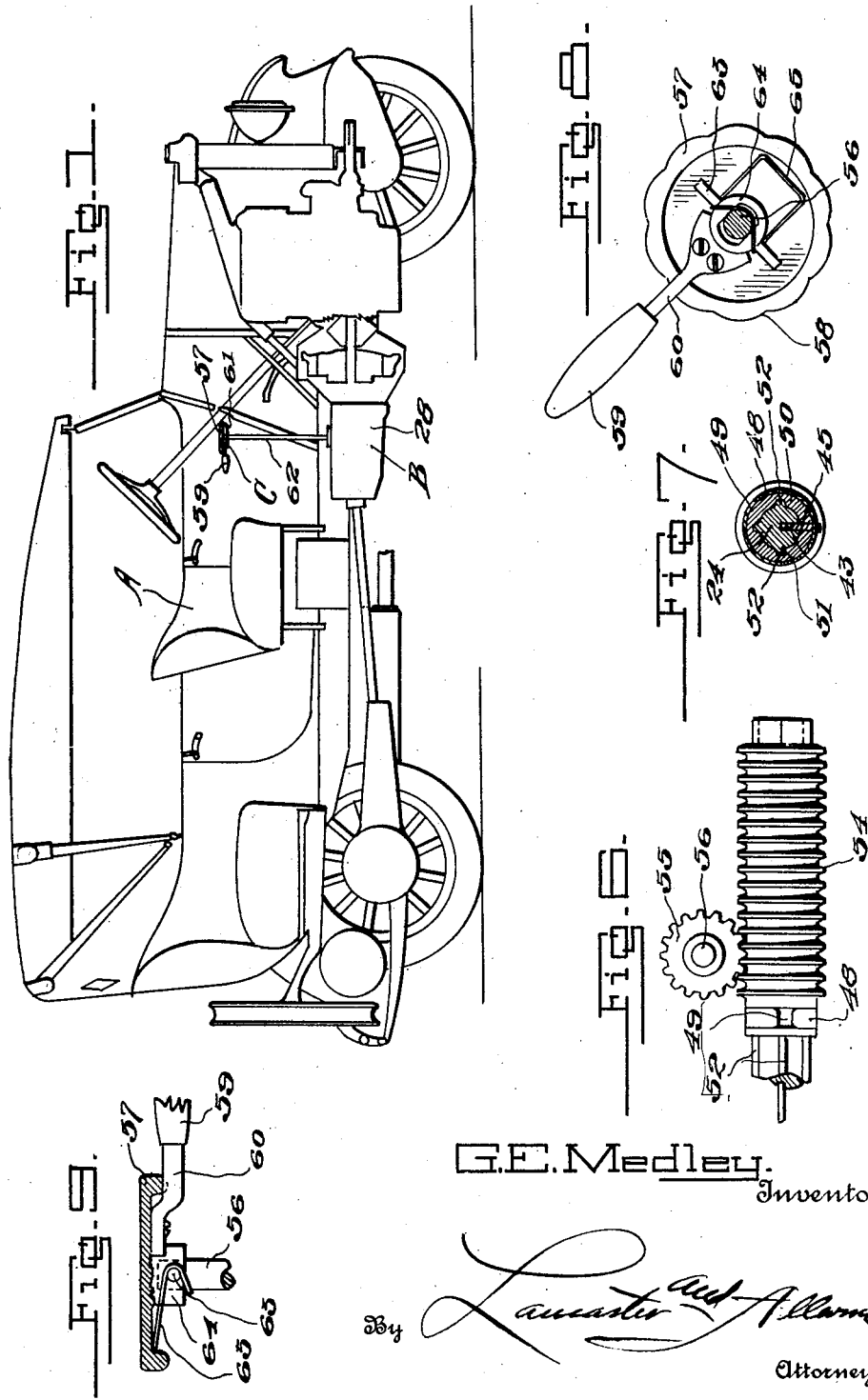

G. E. MEDLEY.
SPEED CHANGE GEAR.
APPLICATION FILED JUNE 2, 1919.

1,342,920.

Patented June 8, 1920.
3 SHEETS—SHEET 3.

G.E.Medley.
Inventor

By Lancaster and Allwine
his Attorneys

UNITED STATES PATENT OFFICE.

GRANVILLE E. MEDLEY, OF HOPKINSVILLE, KENTUCKY, ASSIGNOR OF ONE-FOURTH TO MEDLEY DENNIS AND ONE-FOURTH TO MORTON DENNIS, BOTH OF HOPKINSVILLE, KENTUCKY.

SPEED-CHANGE GEAR.

1,342,920. Specification of Letters Patent. Patented June 8, 1920.

Application filed June 2, 1919. Serial No. 301,231.

*To all whom it may concern:*

Be it known that I, GRANVILLE E. MEDLEY, a citizen of the United States, residing at Hopkinsville, in the county of Christian and State of Kentucky, have invented certain new and useful Improvements in Speed-Change Gears, of which the following is a specification.

This invention relates to the speed-change gear set for use in connection with various types of mechanisms, and more particularly to a speed-change gear set designed for use in connection with motor vehicles.

An object of this invention is to provide a speed-change gear set as specified, which will eliminate many of the inconveniences contingent with the usual type of shiftable gears employed in speed-change gears, among which are the stripping of the teeth from the gears, during the shifting thereof, the jerk and lost motion occasioned by the sliding of the gears and also liability of improper shifting of the gears by imparting improper movement to the gear shifting levers.

Another object of this invention is to provide a speed-change gear set wherein the respective gears are always in mesh, and which gears are collectively connected with the power shaft by the longitudinal movement of a sliding key, which rides through transverse slots formed in a plurality of pins, normally held retracted by the said key and allowed to spring into operative engagement with their respective gear upon the movement of the depressions or cut out portions in the key, in alinement with the respective pins, thereby operatively connecting the said gear with the power shaft, and also to construct the said pins and their receiving openings in such manner as to prevent rotary movement of the pins about their longitudinal centers as an axis, thereby eliminating liability of improper engagement between any of the pins and the teeth and the resulting friction as well as facilitating the assemblage of the gear shift structure.

A still further object of the invention is to provide means for shifting the said key which is operable by means of a hand wheel or lever movable about the center of a post or shaft as an axis, eliminating the undesirable movement contingent with the shafts operable in an H path as commonly employed in the gear shift for motor vehicles, and further to associate means with said shifting means whereby it will be practically impossible to unintentionally or accidentally shift the gears into reverse owing to the provision of a relatively deep slot in the guiding means for the operating structure which will hold the gears in a neutral position, requiring the rocking of the lever or shifting wheel upon its pivot to move the guiding lug carried thereby out of neutral slot for movement into reverse, and also to provide slight depressions in the guide for the member carried by the shifting wheel, whereby the gear set mechanism will be shifted into neutral upon the longitudinal shifting of the key to change the operative relation of the gears.

Other objects of the invention will appear from the following detailed description taken in connection with the accompanying drawings, forming a part of this specification and in which drawings:

Figure 1 is a longitudinal section through a motor vehicle showing the improved gear shifting mechanism applied thereto.

Fig. 2 is a longitudinal section through the gear shifting mechanism showing the pins which engage in their respective gears in side elevation.

Fig. 3 is a section through the gear set taken on the line 3—3 of Fig. 2.

Fig. 4 is a section through one of the gears of the gear set, and through its respective pins.

Fig. 5 is a diagrammatic view of the guide for the movement of the shifting wheel and lever.

Fig. 6 is a detail view in bottom plan of the specific shifting mechanism.

Fig. 7 is a section on the line 7—7 of Fig. 2.

Fig. 8 is a cross section in a horizontal plane through the gear shift illustrating the hand operated shifting wheel and the lever carried thereby.

Fig. 9 is a vertical section through the hand operated shifting wheel.

Figure 11:
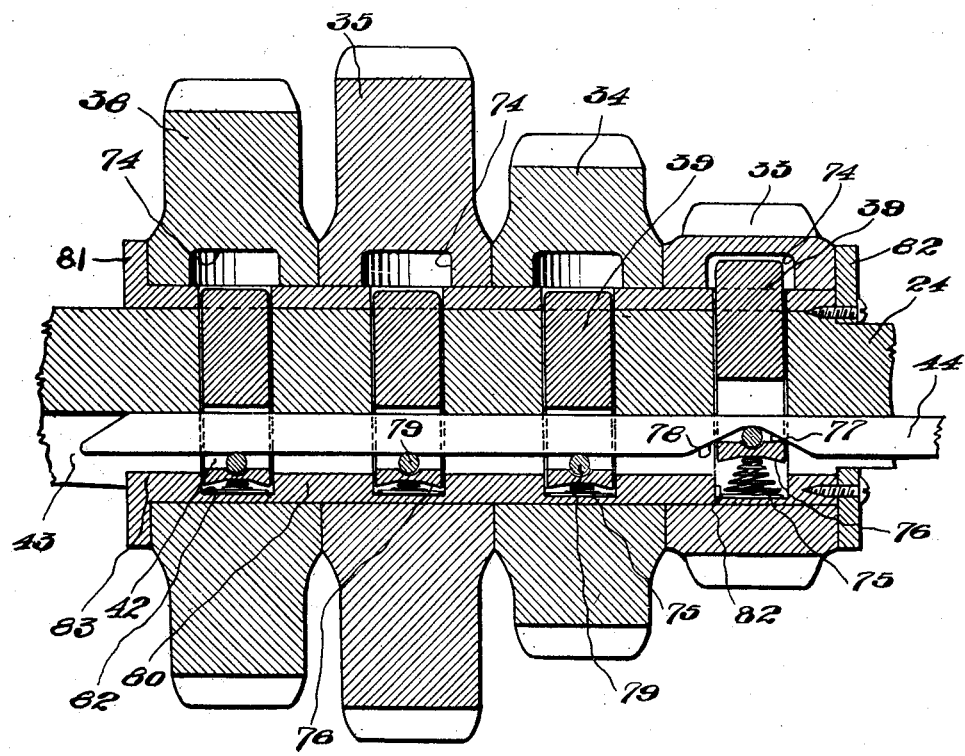
Fig. 11 is a longitudinal section, on an enlarged scale through the gears upon the driven shaft of the mechanism.
Figure 10:
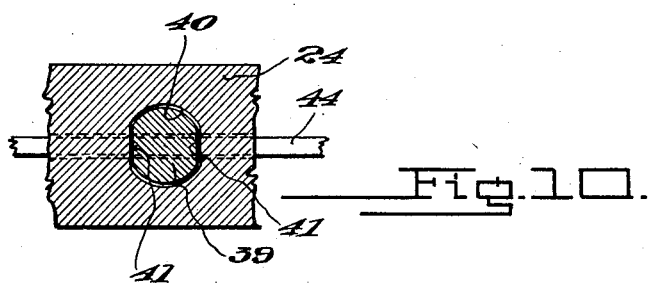
Fig. 10 is a detail section through one of the shafts of the gear set, and through one of the pins which operatively connects the respective gears to the set.

Referring more particularly to the drawings, wherein like characters indicate like and corresponding parts throughout the several views, A indicates the motor vehicle of any approved type, with which the improved gear mechanism B is associated. By particular reference to Fig. 1 of the drawings it will be noted that the operating mechanism or the shifting wheel structure C of the gear set B is positioned so that it may be conveniently reached by the operator of the vehicle.

As is usual in the construction of gear sets for changing the speeds of mechanisms driven from a motor or engine, the engine-driven shaft 20 is connected through the medium of gears 21 and 22 with a counter-shaft 23, which counter-shaft is in turn connected through any pair of the speed-change gears with the driven shaft 24. As shown in Fig. 2 of the drawings the inner end of the driven shaft 24 is reduced in diameter as shown in 25 and is seated in a thrust bearing 26 formed in the end of the driving shaft 20. The driving shaft 20 is rotatably supported by a suitable bearing structure 27 carried by the gear casing or housing 28.

The counter shaft 23 has gears 29, 30, 31 and 32 keyed thereon which mesh respectively with gears 33, 34, 35 carried by the driven shaft 34 and the gear 32 meshes with a gear 36 carried by a stub shaft 37, while the gear 36 in turn meshes with a gear 38 mounted upon the driven shaft 24, thus providing for the reversing of the direction of rotation of the driven shaft. The respective gears or pairs of gears of the gear set are always in mesh, and the gears 33, 34, 35 and 38 rotate idly, upon the driven shaft, they being operatively connected to the driven shaft by means of pins 39, one of which is provided for each of the gears. These pins 39 extend through transverse openings 40 formed in the driven shaft 24, and they are flattened at diametrically opposed points as shown at 41, the openings 40 being flattened accordingly to prevent rotation of the pins in their respective openings and also to facilitate insertion of the pins, while the device is being assembled, so as to insure the positioning of the slot 42 which extends through the pin in alinement with the keyway 43 formed in the driven shaft 24.

The keyway 43 receives therein a slidable longitudinally movable key 44. The outer end of the key 44 is enlarged laterally as shown at 45, and this laterally enlarged end is provided with a recess 46, having a constricted outlet 47. A spring ring 48, which has its ends spaced as shown at 49 sufficient distance to permit disconnection of the key with the ring, extends through the recess 46 and rests in an annular recess formed in one end of the key shifting collar 50. The key shifting collar 50 is provided with a plurality of longitudinally extending recesses 51 which receive therein ribs 52 which are formed upon the driven shaft 24, so as to relieve the key 44 which fits comparatively loosely in the keyway 43 of any strain occasioned by rotation of the shifting collar 50 by rotation of the driven shaft 24. The shifting collar 50 is provided with a plurality of equi-distantly spaced cogs 54 upon its outer surface, and a pinion 55 meshes with cogs 54 for shifting the sleeve 50 longitudinally upon the shaft 24. The pinion 55 is carried by the lower end of the shifting post 56 which rises vertically through the top of the gear casing or housing 28 and has a hand wheel 57 mounted upon its upper end. The periphery of the hand wheel 57 is preferably provided with depressions and extensions as shown at 58 to facilitate the gripping thereof by the hand of the operator of the gear shifting mechanism. The wheel 57 has a lever 59 connected thereto, the stem 60 of which is preferably rectangular in shape and projects beneath the lower edge of the down turned flange upon the wheel as clearly shown in Fig. 9 of the drawings, providing a controlling member for riding over the upper cam edge of a guide 61 which is carried by the upper end of the sleeve 62 which incloses the stem 56. A diagram of the cam edge of the guide 61 is shown in Fig. 5 of the drawings. The wheel 57 is rockably connected to the stem 56 by means of a pin 63 which projects laterally in both directions from the hub or collar 64 of the wheel and this hub or collar is provided with a substantially oval-shaped recess to permit limited rocking movement of the wheel upon the stem. A spring 65 is provided to normally urge the end of the wheel carrying the lever 59 downwardly causing the stem 60 of the lever to move into the various depressions in the upper cam edge of the guide 61 during rotation of the hand wheel 57. This upper cam edge of the guide 61 is provided with upstanding lugs 66 and 67 which limit the amplitude of rotary movement of the wheel 57, and with slight depressions 68, 69, 70 and 71 and a relatively deep depression 72 positioned adjacent the last depression 71 which indicates the reverse position of the gears; that is when the wheel 57 is rotated so that the stem 60 of the lever 59 thereof engages in the depression 71, the speed change gears are connected in such manner as to rotate the driven shaft 24 in a direction reversely to its normal direction of rotation, while the depressions 68, 69 and 70 represent high, intermediate and low speed respectively. The relatively deep depression 72 is located intermediate the depressions 70 and 71, so that during the rotation of the hand shifting wheel 57, the stem 60 will drop into this depression prior to its entrance into the reversing depression 71, thereby rendering it impossible to accidentally shift the gears into reverse as the wheel 57 must be tilted upon its pivoted connection with the stem 56 before the gears can be shifted into reverse. The raised portion 73 intermediate the other depressions will maintain the gears in neutral position for a short space of time during the shifting from one speed to another. The operative connection of the respective gears, 33, 34, 35 and 38 with the driven shaft 24 to regulate the speed of rotation of the said driven shaft is maintained by the movement of the pin 39 associated with the respective gears, into any one of a plurality of radial depressions or recesses 74 formed within the gears, and this movement is caused by the expanding action of the helical spring 75 which engages the inner end of each of the pins. The inner ends of the pins are slightly recessed as shown at 76 to permit the collapsing of the helical springs, which collapsing is further augmented by the helical relation of the coils of the springs. The key 44 is provided with a recess 77 therein, which has inclined approaches 78 and when the key 44 is shifted, by the rotation of the hand shifting wheel 57, to position this recess 77 in alinement with any one of the pins 39, the said pin will be forced by the expanding action of the helical spring 75 which engages its inner end, into one of the radial recesses 74, in its respective gear, thus operatively connecting the said gear to the driven shaft 24 for rotating the driven shaft at the speed represented by the gear which is engaged by this pin. Each of the pins 39 has a roller bearing 79 therein which engages the under edge of the key 44 to eliminate friction in the shifting of the key To facilitate assembling of the pins 39 and gears 33, 34, 35 and 38, a sleeve 80 is provided, having an annular flange 81 on one end, and a collar 82 attached to its other end to maintain the gears 33, 34, 35 and 38 against longitudinal shifting movement, and this sleeve is provided with spaced openings and recesses diametrically opposed to said openings which aline with the openings through the shaft 24 which receive the pins 39 and when these pins are out of operative engagement with their respective gears, their inner ends extend into the recesses 82, formed in the sleeve, which recesses also carry the helical springs 79.

A rib 83 is formed upon the sleeve 80 and seats in the keyway 43 for preventing rotation of the sleeve with respect to the shaft 24.

The guide 61 has an upstanding annular flange 61ᵃ formed thereupon, upon which the ends of the pins 63, engage for supporting the stem 56.

When the hand shifting wheel 57 is rotated, either through the medium of the lever or by the gripping of the wheel with the hand of the operator to move the stem 60 into any one of the depressions, 68, 69, 70 or 71, take for example the depression 68, the key 44 will be shifted, through the medium of the shifting of the sleeve 50 by rotation of the pinion 55 to position the recess 77 formed in the key in alinement with the pin 39 which is associated with the gear 33 thus allowing this pin 39 to be forced into one of the radial recesses 74 in the gear, by the action of the helical spring 75, operatively connecting the gear 33 to the shaft 24 and consequently connecting this pivot shaft 24 with the engine or driving shaft 20 through the gear 29, counter-shaft 23, gears 22 and 21 for rotating the driven shaft 24 by rotation of the drive shaft 20. In case the wheel 57 is rotated to position the stem 60 in the depression 70 the recess 77 would be moved into alinement with the pin 39 associated with the gear 35, allowing this pin to move into one of the recesses 74 into the gear 39 operatively connecting the shaft 24 to the drive shaft 20 through the medium of the low speed gears 35 and 31, countershaft 23 and gears 22 and 21. The operative connection of the shaft 24 with the drive shaft 20 in all of the various speeds and reverse is permitted in the same manner as heretofore described, and it will thus be seen that the many inconveniences contingent with the shifting of gears, the shifting of the lever in its predetermined path and other inconveniences contingent with approved types of gear shifts now in use are eliminated.

Changes in details may be made without departing from the spirit of this invention, but

I claim:

1. In a speed-change gear mechanism, the combination of a drive shaft, a counter shaft operatively connected to said drive shaft, a driven shaft, a plurality of gears of various diameters fixed on said counter shaft, a plurality of complementary gears of various diameters loose upon said driven shaft, radially movable pins carried by the driven shaft, said gears provided with recesses adapted to receive therein the ends of the respective pins, a longitudinally slidable key engaging said pins and normally maintaining them out of the depressions in their respective gears, said key provided with a depression, helical springs engaging said pins for urging the pins into one of the recesses of their respective gears upon movement of the key to position said depression in alinement with the pin, roller bearings carried by said pins and engaging said key, and said pins being flattened at diametrically opposed points to prevent rotation thereof about their longitudinal axis with respect to the driven shaft.

2. In a speed-change gear mechanism, the combination of a shaft, a plurality of gears of various diameters loose upon said shaft, said shaft provided with a plurality of diametrically extending recesses therein, pins slidably mounted in said recesses, said gears provided with recesses adapted for movement into alinement with the openings in said shaft, a longitudinal keyway in said shaft, a key slidable in said keyway and normally restraining said pins from movement in said recesses, said key provided with a depression to permit movement of one of the keys into one of the recesses in its respective gears upon positioning of said depressions in alinement with the pin, helical springs engaging the inner end of said pins for urging the pins into the gear carried recesses, upon the positioning of the depression of said key into alinement with said pins, a sleeve mounted about said shaft and carrying said gears, said sleeve provided with recesses receiving said helical springs and the inner ends of said pins therein.

3. In a speed-change gear mechanism, the combination of a shaft, a plurality of gears of various diameters loose upon said shaft, said shaft provided with a plurality of diametrically extending recesses therein, pins slidably mounted in said recesses, said gears provided with recesses adapted for movement into alinement with the openings in said shaft, a longitudinal keyway in said shaft, a key slidable in said keyway and normally restraining said pins from movement in said recesses, said key provided with a depression to permit movement of one of the keys into one of the recesses in its respective gears upon positioning of said depressions in alinement with the pin, helical springs engaging the inner end of said pins for urging the pins into the gear carried recesses upon the positioning of the depression of said key into alinement with said pins, a sleeve mounted about said shaft and carrying said gears, said sleeve provided with recesses receiving said helical springs and the inner ends of said pins therein, a shifting sleeve for shifting said key, said sleeve provided with an annular depression in one end, a lateral extension formed upon said key, and a split-spring ring seated in said depression and extending through said lateral depression for connecting the key through its shifting sleeve.

4. In a speed-change gear mechanism, the combination of a shaft, a plurality of gears of various diameters loose upon said shaft, said shaft provided with a plurality of diametrically extending recesses therein, pins slidably mounted in said recesses, said gears provided with recesses adapted for movement into alinement with the openings in said shaft, a longitudinal keyway in said shaft, a key slidable in said keyway and normally restraining said pins from movement in said recesses, said key provided with a depression to permit movement of one of the keys into one of the recesses in its respective gears upon positioning of said depressions in alinement with the pin, helical springs engaging the inner end of said pins for urging the pins into the gear carried recesses upon the positioning of the depression of said key into alinement with said pins, a sleeve mounted about said shaft and carrying said gears, said sleeve provided with recesses receiving said helical springs and the inner ends of said pins therein, a shifting sleeve for shifting said key, said sleeve provided with an annular depression in one end, a lateral extension formed upon said key, a split spring ring seated in said depression, and extending through said lateral depression for connecting the key through its shifting sleeve, and longitudinally extending radial ribs upon said shaft and engaging in complementary grooves in said shifting sleeve to relieve said key of strain under rotation of the shaft and sleeve.

5. In a speed-change gear mechanism, the combination of means for selecting speed gears including a rotary hand wheel, a radial stem carried by said hand wheel and engaging beneath the lower edge of the same, and a guide provided with a plurality of depressions adapted to receive said stem, each depression representing a gear of the speed-change gear mechanism.

6. In a speed-change gear mechanism, the combination with a shaft, a plurality of gears of various diameters loose upon said shaft, radially movable pins carried by said shaft, means engaging said pins and normally holding them out of engagement with their respective gears, means for urging the pins into operative engagement with the gears upon predetermined adjusted relation of said first-named means with the pins, and means for adjusting said first-named means comprising a hand-wheel, a stem extending radially from said hand-wheel, a guide provided with a plurality of depressions representing pre-determined adjusted positions of said first-named means whereby by rotation of said hand wheel said first-named means may be adjusted to permit operative engagement of any one of said pins with its respective gears.

7. In a speed-change gear mechanism, the combination with a shaft, a plurality of gears of various diameters loose upon said shaft, radially movable pins carried by said shaft, means engaging said pins and normally holding them out of engagement with their respective gears, means for urging the pins into operative engagement with the gears upon predetermined adjusted relation of said first-named means with the pins, means for adjusting said first named means comprising a hand-wheel, a stem extending radially from said hand-wheel, a guide provided with a plurality of depressions representing pre-determined adjusted positions of said first-named means whereby by rotation of said hand wheel said first-named means may be adjusted to permit operative engagement of any one of said pins with its respective gears, said guide provided with a relatively deep depression to receive said stem and hold said first-named means in a neutral position.

8. In a speed change gear mechanism, the combination of a drive shaft, a counter-shaft operatively connected to said drive shaft, a driven shaft, a plurality of gears of various diameters fitted on said counter-shaft, a plurality of complementary gears of various diameters loose upon said driven shaft, radially movable pins carried by said driven shaft and extending diametrically therethrough, a sleeve surrounding the drive shaft and pins, the sleeve having openings for receiving one end of the pins, the inner face of the sleeve having depressions formed therein diametrically opposite the openings, springs fitted in the depressions for normally urging the pins outwardly through the openings in the sleeve into engagement with the gears, and means engaging said pins and normally holding them out of engagement with their respective gears.

9. In a speed change gear mechanism, the combination of a drive shaft, a counter-shaft operatively connected to said drive shaft, a driven shaft, a plurality of gears of various diameters fitted on said counter-shaft, a plurality of complementary gears of various diameters loose upon said driven shaft, radially movable pins carried by said driven shaft, a longitudinally slidable key carried by said driven shaft and engaging said pins for normally holding them out of engagement with their respective gears, means engaging said pins for urging them into operative engagement with the gears upon predetermined adjusted relation of the key with the pins, a sleeve slidably mounted upon the driven shaft, means connecting the sleeve with the key, the sleeve having a plurality of equi-distantly spaced annular cogs arranged on the outer surface thereof, a gear engaging the cogs, and means for rotating the gear.

GRANVILLE E. MEDLEY.